United States Patent Office 3,434,372
Patented Mar. 25, 1969

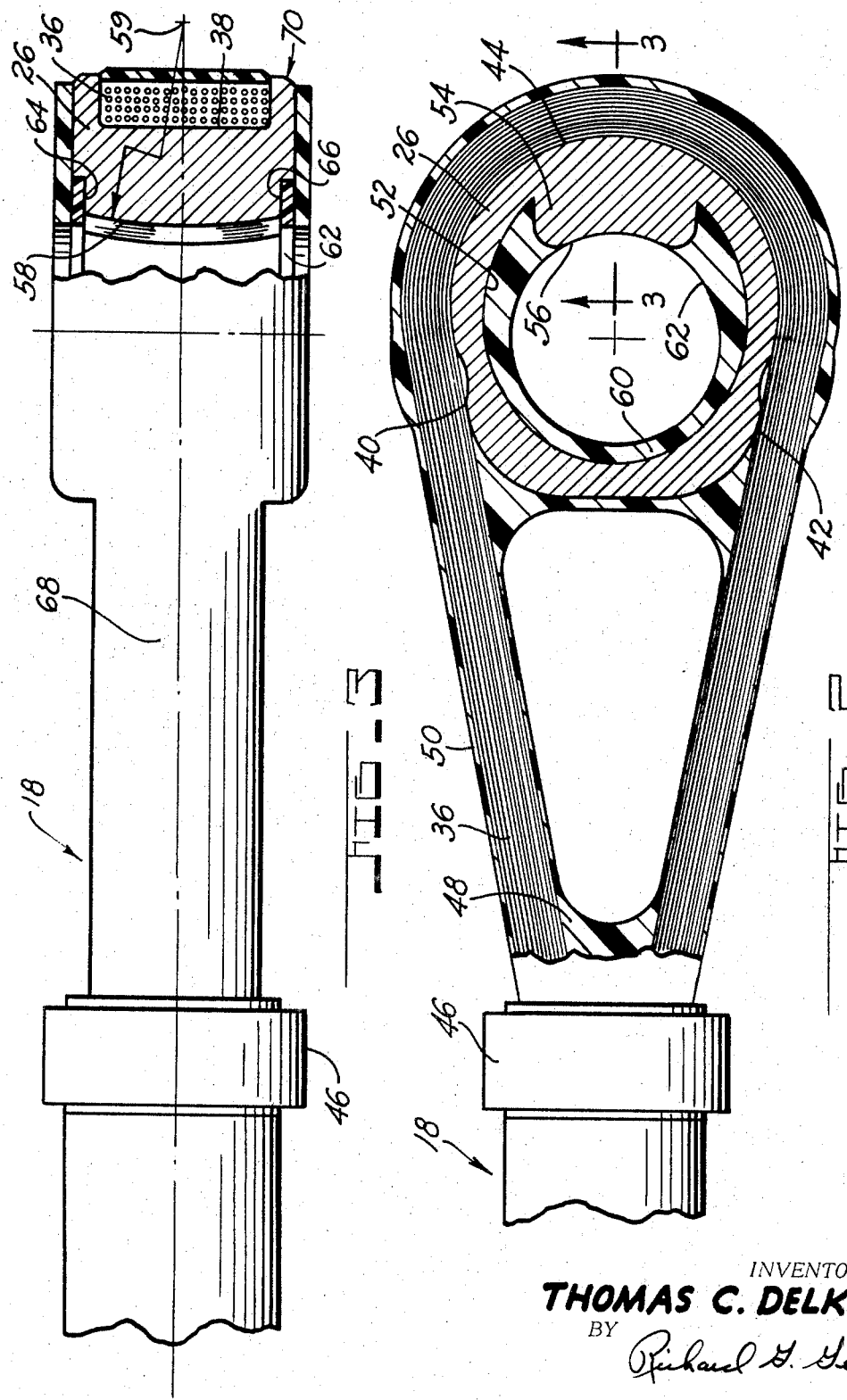

3,434,372
COUPLER
Thomas C. Delker, South Bend, Ind., assignor to The Bendix Corporation, a corporation of Delaware
Filed Mar. 2, 1967, Ser. No. 620,086
Int. Cl. F16b *17/00*
U.S. Cl. 74—579                   6 Claims

ABSTRACT OF THE DISCLOSURE

End fittings for an endless coupler between pin connections of structures whose horizontal planes may vary with respect to each other which have cavities for wrapping the coupler therearound while bounding it thereto with a central opening formed by a surface of compound curvature to permit rocking of the end fittings with respect to the pin surface.

SUMMARY

Endless couplers comprising flexibly integrated filaments with bushings at each end are being utilized in helicopter rotor systems. In some rotor systems the helicopter blade is designed to flap or move up and down with respect to the rotor arm. Until the advent of this invention it appeared that this would present adverse bending loads within the endless coupling.

This invention, therefore, is to permit the horizontal planes of structures united to vary with respect to each other without imparting bending loads to the endless coupler.

DRAWING DESCRIPTION

FIGURE 2 is a cross sectional plan view of the end fitting for the tie-bar; and

FIGURE 3 is a partially cross sectioned side view of a tie-bar or coupler with the cross section taken along lines 3—3 of FIGURE 2;

DETAILED DESCRIPTION

Figure 1:
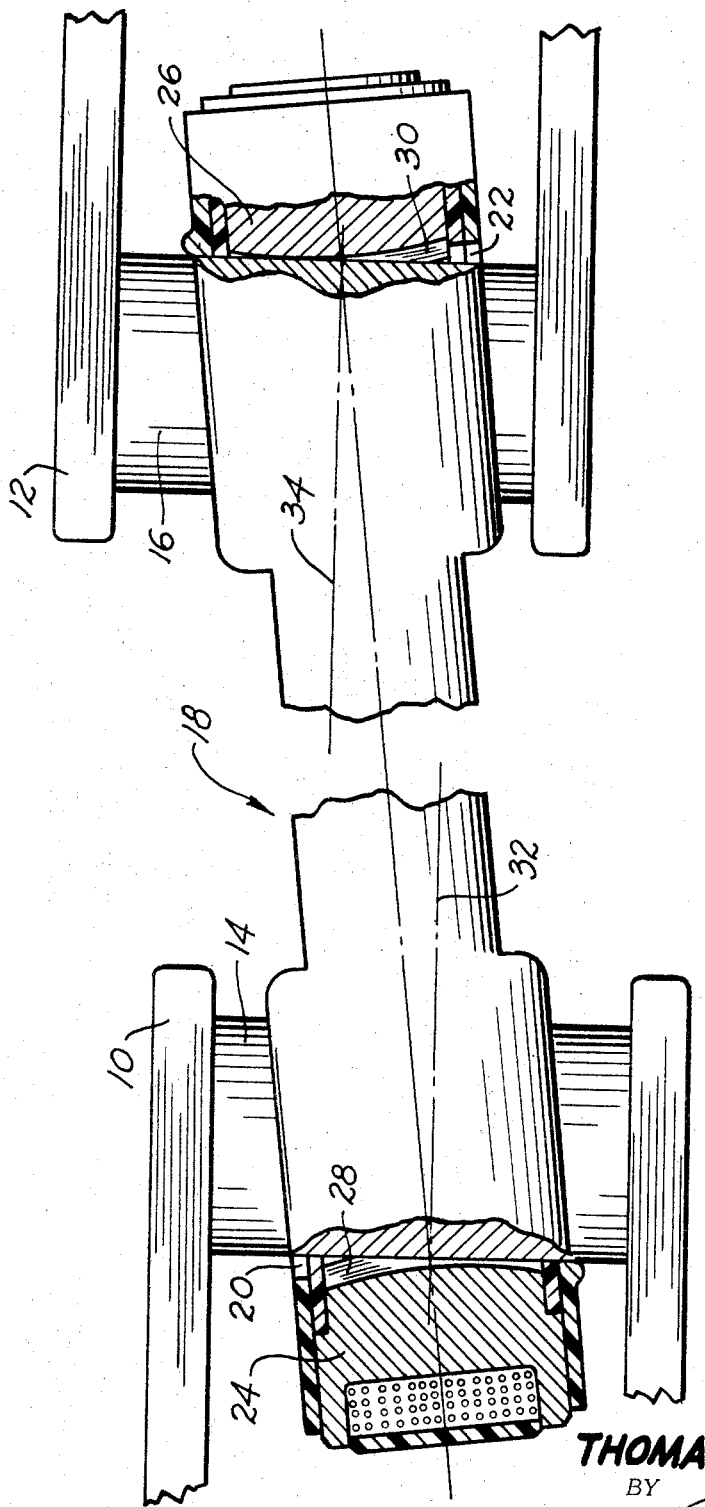
FIGURE 1 is a side view showing a tie-bar partially in cross section connecting two structures of different horizontal planes with respect to each other.

As seen in FIGURE 1 two structures, for example, a helicopter rotor arm 10 schematically illustrated and a helicopter rotor blade 12 also schematically illustrated are provided with pins 14 and 16. A tie-bar or coupler, as it may be termed, joins the rotor arms 10 and 12 by placing the pins 14 and 16 through the holes 20 and 22, respectively, within the end fittings 24 and 26 of the tie-bar. As seen, the end fittings 24 and 26 are provided with surfaces 28 and 30 of compound curvature to permit the rocking of the tie-bar or coupler on the pins 14 and 16 allowing for the variances in the horizontal planes of the rotor arm and the rotor blade shown by the dashed line 32 and 34, respectively.

As may be more particularly observed in FIGURE 2, the coupler is constructed by laminating a plurality of filaments 36 that are integrated by means of a flexible adhesive such as an elastomeric substance or a flexibly compounded resin, depending upon the degree of flexibility required. One such substance utilized thus far in the construction of the lamination of filaments 36 is polyurethane. In both FIGURES 2 and 3 the cross hatching denoting the resilient substance coating and enclosing the filaments 36 has been eliminated in order to more clearly show the relationship of the filaments 36. During the construction of the coupler the coated filaments 36 are wrapped around the end fittings 24 and 26 within a cavity 38, shown with regard to end fitting 26 and FIGURE 3 which is also provided in the end fitting 24 in a similar manner. This cavity is provided with side portions 40 and 42 that are connected by a rounded portion 44 so that the load bearing area between the flexibly integrated filaments 36 and the end fittings 24 and 26 is sufficient to transfer tensile loads within the coupler 18 to the end fittings and to the pins 14 and 16.

As seen in FIGURE 2 the side portions 40 and 42 have slightly converging faces so as to ensure the tangency of the sides of the tie-bars 18 as they leave the fittings 24 and 26 to be drawn together in the middle by means of a pair of rings 46 (one of which is shown by FIGURES 2 and 3 with a flexible core 48 therebetween throughout the central length of the coupler where the side portions of the coupler are closely adjacent to each other due to the rings 46). This core 48 is preferably united with the enclosing coating 50 that is provided on the coupler after the assembly of the filaments 36 to the end fittings 24 and 26.

With more specific regard now to the end fittings, and as they are both similar in construction the following description relative to the end fitting 26 should be considered equally applicable to the construction of the end fitting 24. The end fittings are provided each with, in addition to the cavities 38, an elongated opening 52 having an inwardly projecting body 54 inwardly of the rounded portion 44 which terminates in a toroidal surface, i.e., a concave surface 56 in the horizontal plane which is machined to have a convex surface of revolution 58 in the vertical plane, see FIGURE 3. In other words the surfaces are generated about a toroidal center 59. An elastomeric substance 60 can then be formed in the elongated opening 52 to bond to the bushing 26 and to the sides of the inwardly projecting structure 54 to prescribe a pin hole 62 through the bushing.

In the form shown elastomeric filler 60 is shown to fit within 64 and 66 of the end fittings (see FIGURE 3) so that the pin hole 62 has a consistent diameter not only at the axis 68 of the coupler 18 but as at the upper and lower surfaces of the end fitting. Also, as seen in FIGURE 3, the coating 50 extends above and below the end fitting and around the outside, and if desired, it may be trimmed away as at the corners 70 of the end fittings. Thus the filler 60 and the coating or enclosing substance 50 may act to maintain the contact of the end fittings 24 and 26 on the convex surface 58 adjacent the axis 68 of the coupler. This will be a line contact having, because of the small radius of curvature for the convex surface 58, sufficient bearing relationship between the end fittings and the pins 14 and 16 to transfer loadings within the coupling 18 to the pins and the respective structures.

Depending upon the degree of rocking desired in the coupler 18, soft rubber bushings may be utilized to locate the coupler between the ears of the rotor arm and the rotor blade, or if the rocking is to be slight, the coating 50 may be increased in dimension about the end fittings.

Having fully described a preferred construction and use for my invention, I now set forth the claims which are intended to cover all changes and modifications of the examples of the invention herein chosen for purposes of disclosure, which do not constitute departures from the spirit and scope of the invention sought to be protected thereby.

I claim:

1. An end fitting for an endless lamination of parallel filaments integrated by an adhesive, said end fitting comprising:

a tubular body having a concave surface in the horizontal plane which is a convex surface of revolution in the vertical plane; and flanges on said body forming a cavity thereabout of a predetermined depth.

2. An end fitting for an endless coupling, said end fitting comprising:
   a body with upper and lower flanges prescribing a cavity having side portions which are joined by a rounded portion of said cavity to prescribe a predetermined load bearing surface, said body having an opening therethrough within which a projection having a surface of compound curvature projects away from said rounded portion; and
   a filler having resilient properties within said opening and bonded therein to said body and flush with the sides of the compound surfaces of said projection to prescribe a circular face of limited dimension to either side of a plane passing through a longitudinal axis of the coupling.

3. An end fitting according to claim 2 wherein said surface of compound curavture is concave in the horizontal plane and convex in the vertical plane.

4. A coupling for structures whose horizontal planes may vary with respect to each other under loading such as a helicopter rotor arm and a helicopter rotor blade, said coupling comprising:
   a first pin affixed to one of the structures;
   a second pin affixed to another of the structures;
   an endless lamination of filaments integrated by a flexible adhesive, said lamination having first and second end fittings with means to abuttingly relate, respectively, to said first and second pins on a load bearing surface of compound curvature to permit variances in the horizontal planes of the structures without bending said lamination.

5. A coupling according to claim 4 wherein said first and second end fittings may each be characterized as comprising:
   a flanged tubular body with an elongated opening having an inwardly projecting surface which is concave in the horizontal plane and convex in the vertical plane to mate with said first and second pins on a limited area of contact; and
   a filler bonded to said body in said opening to normally maintain said pins in contact with said surface such that said area of contact is along a longitudinal axis of said endless lamination.

6. A coupling according to claim 5 wherein said filler conforms to the concave and convex curvatures of said surface and to said pin opposite said surface, said filler having deforming qualities to permit rocking of said endless lamination.

References Cited

UNITED STATES PATENTS

| | | | |
|---|---|---|---|
| 1,931,808 | 10/1933 | Andersen | 294—74 |
| 3,026,942 | 3/1962 | Cresap | 170—160.53 XR |
| 3,214,812 | 11/1965 | Beneduce | 294—74 XR |
| 3,362,253 | 1/1968 | Ditlinger | 74—579 |

HALL C. COE, *Primary Examiner.*

U.S. Cl. X.R.

170—160.53; 308—72